United States Patent
Suehiro

(10) Patent No.: US 6,400,464 B1
(45) Date of Patent: Jun. 4, 2002

(54) IMAGE FORMING DEVICE

(75) Inventor: Tatsuo Suehiro, Hino (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/308,226

(22) PCT Filed: Sep. 18, 1998

(86) PCT No.: PCT/JP98/04221

§ 371 (c)(1),
(2), (4) Date: May 19, 1999

(87) PCT Pub. No.: WO99/16237

PCT Pub. Date: Apr. 1, 1999

(30) Foreign Application Priority Data

Sep. 19, 1997 (JP) ............................................. 9-255807

(51) Int. Cl.⁷ ............................................. G06K 15/00
(52) U.S. Cl. ...................................... 358/1.16; 358/1.14
(58) Field of Search ................................. 358/1.1, 1.12, 358/1.13, 1.14, 1.16, 1.15, 437, 296; 710/52, 53, 56, 57; 271/303, 900; 399/15; 347/104; 400/629, 625, 636; 101/227

(56) References Cited

U.S. PATENT DOCUMENTS

| 3,936,180 A | * | 2/1976 | Willard et al. ............... 358/437 |
| 4,907,094 A | | 3/1990 | Mishima et al. ............. 358/437 |
| 4,970,599 A | * | 11/1990 | Nobuta ........................ 358/296 |
| 5,353,406 A | | 10/1994 | Mikuni ........................ 395/165 |

FOREIGN PATENT DOCUMENTS

| JP | 63-187766 | 8/1988 |
| JP | 63-279269 | 11/1988 |
| JP | 3-62670 | 3/1991 |
| JP | 3-265361 | 11/1991 |
| JP | 5-41759 | 2/1993 |
| JP | 9-153993 | 6/1997 |

* cited by examiner

Primary Examiner—Arthur G. Evans
(74) Attorney, Agent, or Firm—Foley & Lardner

(57) ABSTRACT

When an image memory (106) may be full during facsimile reception, and an image processing section (314) causes a printer section (6) to currently perform a copying operation, the copying operation is interrupted, and facsimile reception is continued while reading out reception image data in the chronological order and performing printing, thereby avoiding a memory full state of the image memory (106) and preventing line disconnection.

14 Claims, 15 Drawing Sheets

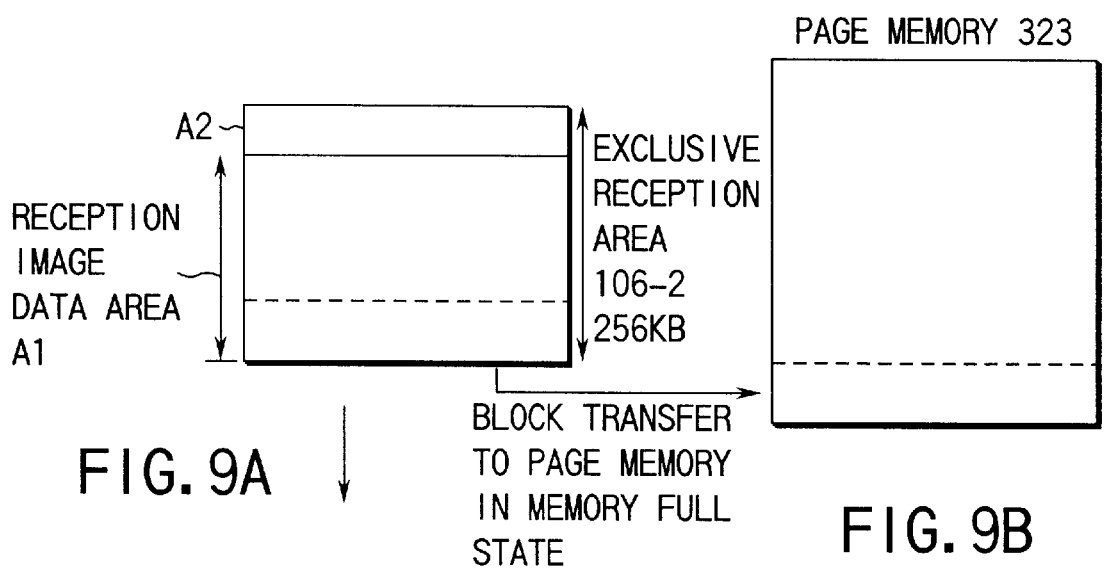
FIG. 9A
FIG. 9B
BLOCK TRANSFER TO PAGE MEMORY IN MEMORY FULL STATE
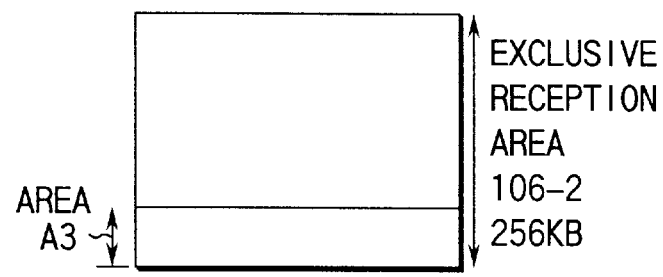
FIG. 9C

IMAGE FORMING DEVICE

TECHNICAL FIELD

The present invention relates to an image forming apparatus having, e.g., a facsimile function and a copying function and, more particularly, to an image forming apparatus having a function of issuing reception image data printing start request when the remaining capacity of a reception image memory for storing image data received by facsimile has a predetermined value or less, and detecting at this time whether paper jam has occurred and whether a copying operation has been performed.

BACKGROUND ART

To effectively use the printer resource for a printing job, an image forming apparatus having a facsimile function and a copying function has a function of temporarily storing facsimile image data in an image memory to prevent a document being subjected to facsimile communication from occupying the printer, and sequentially transferring the stored image data to a page memory and printing it.

In a communication protocol generally used for a facsimile apparatus, reception completion is returned to the transmission side. To guarantee this, preferably, printing of received image data is started before the image memory for storing received image data becomes full, thereby effectively using the reception image memory and preventing a line disconnection state due to the memory full state.

As far as all transmitted image data are stored in the image memory, even power is turned off or paper jam occurs during printing a received document and image data transferred from the image memory to the page memory is lost, the image data can be read out from the image memory again after power is restored or paper jam is eliminated, so no problem is posed.

In an image forming apparatus having a facsimile function, facsimile image data to be transmitted is temporarily stored in an image memory by transmission reservation. However, the memory may become full. To allow the facsimile reception even in this case, an exclusive reception area is formed in the image memory. However, even this exclusive reception area may become full during storage reception.

When this exclusive reception area becomes full during the storage reception, the former received image is transferred to the page memory while being developed, printing is executed, and just received image data is continuously overwritten in a printing completion area, thereby continuing reception without any interruption. However, the facsimile reception image data cannot sometimes be printed because paper jam has already occurred or because a copying operation has been performed. In the paper jam state, printing cannot be performed. Conventionally, even during the copying operation, the copying operation has priority over the facsimile operation, and facsimile reception image data cannot be printed. Hence, the image memory for facsimile reception often becomes full, resulting in a disadvantage such as line disconnection.

For example, FIG. 12 of Jpn. Pat. Appln. KOKAI Publication No. 5-284265 shows an apparatus having two printers, in which when a FAX function is performed, reception data by the FAX interface section is stored not in a memory on the FAX side but in a memory on the system controller side.

However, the apparatus of this prior art has two printers and is therefore complex and expensive. In addition, when the memory for storing FAX reception data becomes full, the FAX reception line is disconnected.

It is therefore an object of the present invention to provide a convenient image forming apparatus, which can print a facsimile reception image even during a copying operation when a facsimile reception image memory becomes full and minimizes line disconnection.

DISCLOSURE OF INVENTION

An image forming apparatus of the present invention is characterized by comprising a reception image memory for storing reception image data, means for checking whether a printing operation using the reception image data stored in the reception image memory can be started when a remaining capacity of the reception image memory has not more than a predetermined value, means for starting printing using the reception image data when it is determined by the checking means that printing is possible, means for, when a printing disable state is detected by the checking means, displaying the printing disable state and checking whether a cause is paper jam, and means for, when the cause is paper jam, causing the reception image memory to continuously receive and store the reception image data.

An image forming apparatus characterized by further comprising, in addition to the above arrangement, interruption designation means for, during an operation of a copying means, designating to interrupt the operation, and means for printing the reception image data in response to the interruption designation.

The apparatus is characterized by further comprising means for causing the copying means to resume the interrupted printing when printing of the reception image data is completed.

According to the present invention, an image forming apparatus in an image data transmission/reception system including first and second apparatuses having reading means, connected to each other through a communication line, for reading originals and converting an read original signal into image data, transmission means for transmitting image data read from the originals, reception means for receiving the image data, and image forming means for forming images of the image data on a target image forming medium, characterized in that each of the first and second apparatuses comprises a reception image memory for storing reception image data, means for checking whether a printing operation using the reception image data stored in the reception image memory can be started when a remaining capacity of the reception image memory has not more than a predetermined value, means for starting printing using the reception image data when it is determined by the checking means that printing is possible, means for, when a printing disable state is detected by the checking means, displaying the printing disable state and checking whether a cause is paper jam or an operation of copying means, means for, when the cause is paper jam, causing the reception image memory to continuously receive and store the reception image data, interruption designation means for, when the cause is the operation of the copying means, designating interruption, and means for printing the reception image data in response to the interruption designation.

According to the present invention, a convenient image forming apparatus which allows an interrupt for printing facsimile reception image data even when a copying operation is being performed in the memory full state of a facsimile reception image memory, and switches the job to preferentially print the facsimile reception image data can be provided.

BRIEF DESCRIPTION OF DRAWINGS

FIGS. 9A to 9C are views showing the relationship between the image memory and a page memory in association with memory contents.

BEST MODE FOR CARRYING OUT INVENTION

An image forming apparatus according to an embodiment of the present invention will be described below with reference to the accompanying drawings. This image forming apparatus is constituted as a copying machine having a facsimile function.

The internal structure of this copying machine will be described with reference to the schematic view shown in FIG. 1.

Figure 1:
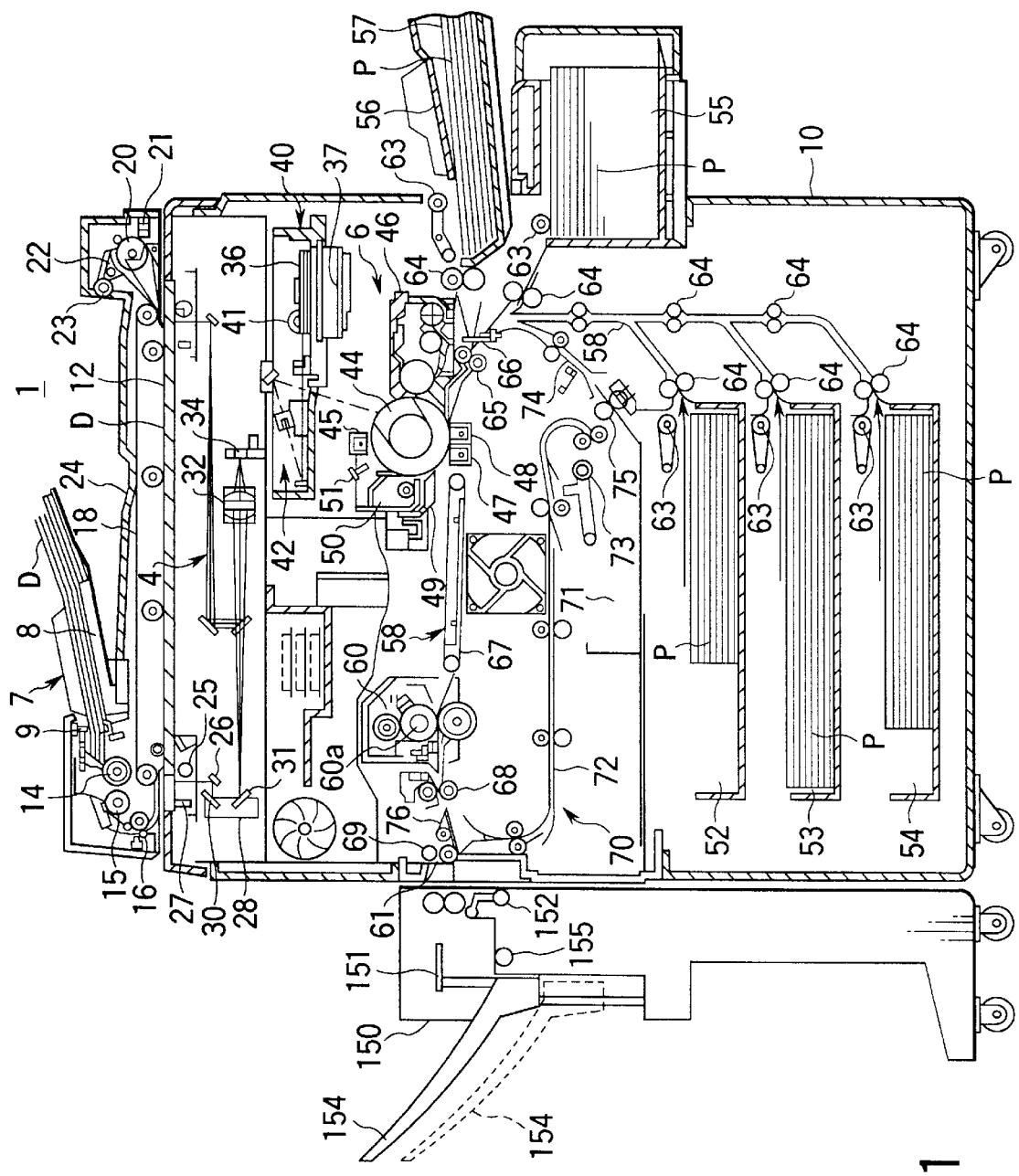
FIG. 1 is a view showing the schematic arrangement of an image forming apparatus according to an embodiment of the present invention.

As shown in FIG. 1, a copying machine 1 has an apparatus main body 10. The apparatus main body 10 incorporates a scanner section 4 functioning as a reading means and a printer section 6 functioning as an image forming means (both will be described later).

An original table 12 formed from transparent glass, on which a read object, i.e., an original D for facsimile transmission or copy is placed, is arranged on the upper surface of the apparatus main body 10. An automatic document feeder 7 (to be referred to as an ADF hereinafter) for automatically feeding originals onto the original table 12 is disposed on the upper surface of the apparatus main body 10. The ADF 7 is arranged to be opened/closed with respect to the original table 12 and also functions as an original cover for bringing the original D placed on the original table 12 into tight contact with the original table 12.

The ADF 7 has an original tray 8 on which the original D is set, an empty sensor 9 for detecting the presence/absence of originals, pickup rollers 14 for extracting originals on the original tray 8 one by one, a feed roller 15 for conveying the extracted original, an aligning roller pair 16 for aligning the leading edges of the originals, and a conveyor belt 18 arranged to cover almost the entire surface of the original table 12.

A plurality of originals set on the original tray 8 with their surfaces facing up are sequentially extracted from the lowermost page, i.e., the final page, aligned by the aligning roller pair 16, and conveyed to a predetermined position on the original table 12 by the conveyor belt 18.

In the ADF 7, a reversing roller 20, a non-reverse sensor 21, a flapper 22, and a delivery roller 23 are disposed at the end portion on the opposite side of the aligning roller pair 16 with respect to the conveyor belt 18.

The original D whose image information is read by the scanner section 4 (to be described later) is fed from the original table 12 by the conveyor belt 18 and delivered to an original delivery portion 24 on the ADF 7 through the reversing roller 20, flapper 21, and delivery roller 22.

To read the lower surface of the original D, the flapper 22 is switched. The original D conveyed by the conveyor belt 18 is reversed by the reversing roller 20 and fed to a predetermined position on the original table 12 again by the conveyor belt 18.

The scanner section 4 incorporated in the apparatus main body 10 has an exposure lamp 25 as a light source of illuminating the original D placed on the original table 12, and a first mirror 26 for deflecting reflected light from the original D in a predetermined direction. The exposure lamp 25 and first mirror 26 are attached to a first carriage 27 disposed under the original table 12.

The first carriage 27 is disposed to be movable in parallel to the original table 12 and reciprocally moved under the original table 12 by a driving motor through a toothed belt (not shown).

A second carriage 28 movable in parallel to the original table 12 is disposed under the original table 12. Second and third mirrors 30 and 31 for sequentially deflecting reflected light from the original D, which is deflected by the first mirror 26, are attached to the second carriage 28 so as to make a right angle. The second carriage 28 is moved by, e.g., the toothed belt for driving the first carriage 27 together with the first carriage 27, and moved in parallel along the original table 12 at a speed 1/2 that of the first carriage.

An imaging lens 32 for focusing reflected light from the third mirror 31 mounted on the second carriage 28, and a CCD sensor 34 for receiving the reflected light focused by the imaging lens and photoelectrically converting it are also disposed under the original table 12. The imaging lens 32 is disposed to be movable through a driving mechanism in a plane including the optical axis of the light deflected by the third mirror 31, and forms the image of the reflected light at a desired magnification by moving itself. The CCD sensor 34 photoelectrically converts the incoming reflected light and outputs an electrical signal corresponding to the read original D.

On the other hand, the printer section 6 has a laser exposure apparatus 40 functioning as a latent image forming means. The laser exposure apparatus 40 comprises a semiconductor laser 41 as a light source, a polygon mirror 36 as a scanning member for continuously deflecting a laser beam emitted by the semiconductor laser 41, a polygon motor 37 as a scanning motor for rotatably driving the polygon mirror 36 at a predetermined rotational speed (to be described later), and an optical system 42 for deflecting the laser beam from the polygon mirror and guiding the beam to a photosensitive drum 44 (to be described later). The laser exposure apparatus 40 having the above arrangement is permanently fixed on a support frame (not shown) of the apparatus main body 10.

The semiconductor laser 41 is ON/OFF-controlled in accordance with the image information of the original D read by the scanner section 4 or facsimile transmission/reception document information. The laser beam is directed to the photosensitive drum 44 through the polygon mirror 36 and optical system 42 to scan the outer surface of the photosensitive drum 44, thereby forming an electrostatic latent image on the outer surface of the photosensitive drum 44.

The printer section 6 has the rotatable photosensitive drum 44 as an image carrier disposed almost at the center of the apparatus main body 10. The outer surface of the photosensitive drum 44 is exposed to the laser beam from the laser exposure apparatus 40, so a desired electrostatic latent image is formed. Around the photosensitive drum 44, a charger 45 for applying predetermined charges to the outer surface of the drum, a developing unit 46 for supplying toner as a developer to the electrostatic latent image formed on the outer surface of the photosensitive drum 44 to develop it at a desired image density, a transfer charger 48 which is integrated with a separation charger 47 for separating a copy paper sheet P from the photosensitive drum 44 and transfers the toner image formed on the photosensitive drum 44 to a transfer medium, i.e., the paper sheet P fed from a paper cassette (to be described later), a separation gripper 49 for separating the copy paper sheet P from the outer surface of the photosensitive drum 44, a cleaning unit 50 for removing toner remaining on the outer surface of the photosensitive drum 44, and a discharging unit 51 for discharging the outer surface of the photosensitive drum 44 are sequentially arranged.

An upper cassette 52, a middle cassette 53, and a lower cassette 54 which can be pulled from the apparatus main body are stacked at the lower portion of the apparatus main body 10. These cassettes store copy paper sheets with different sizes. A large-capacity feeder 55 is arranged on one side of these cassettes. This large-capacity feeder 55 stores about 300 copy paper sheets P having a size with high use frequency, e.g., copy paper sheets P with A4 size. A feed cassette 57 also serving as a manual feed tray 56 is detachably attached above the large-capacity feeder 55.

A convey path 58 extending from the cassettes and large-capacity feeder 55 through a transfer section located between the photosensitive drum 44 and transfer charger 48 is formed in the apparatus main body 10. A fixing unit 60 having a fixing lamp 60a is disposed at the end of the convey path 58. A delivery port 61 is formed in the side wall of the apparatus main body 10 opposing the fixing unit 60. A single-tray finisher 150 is attached to the delivery port 61.

Pickup rollers 63 for extracting the paper sheets P one by one from the cassette or large-capacity feeder are arranged near each of the upper cassette 52, middle cassette 53, lower cassette 54, and feed cassette 57 and near the large-capacity feeder 55. A number of feed roller pairs 64 for conveying the copy paper sheet P extracted by the pickup rollers 63 through the convey path 58 are arranged in the convey path 58.

A resist roller pair 65 is arranged in the convey path 58 on the upstream side of the photosensitive drum 44. The resist roller pair 65 corrects the tilt of the extracted copy paper sheet P, matches the leading edge of the toner image on the photosensitive drum 44 with the leading edge of the copy paper sheet P, and feeds the copy paper sheet P to the transfer section at the same speed as the moving speed of the outer surface of the photosensitive drum 44. A prealigning sensor 66 for detecting arrival of the copy paper sheet P is provided on the feed roller 64 side.

Paper sensors (not shown) for detecting paper jam (jam) are arranged at appropriate portions in the convey path in which the paper sheets P are extracted one by one from the cassette 52, 53, 54, or 75 or the large-capacity feeder 55 and delivered through the developing, transfer, and fixing units. If paper jam occurs, the conveyance operation is immediately interrupted to cause the operator to recognize the paper jam.

Each copy paper sheet P extracted from the cassette or large-capacity feeder 55 by the pickup rollers 63 is fed to the resist roller pair 65 by the feed roller pair 64. After the leading edge of the copy paper sheet P is aligned by the resist roller pair 65, the copy paper sheet P is fed to the transfer section.

In the transfer section, a developer image, i.e., toner image formed on the photosensitive drum 44 is transferred to the paper sheet P by the transfer charger 48. The copy paper sheet P on which the toner image is transferred is separated from the outer surface of the photosensitive drum 44 by the function of the separation charger 47 and separation gripper 49 and conveyed to the fixing unit 60 through a conveyor belt 67 constituting part of the convey path 52. After the developer image is fused and fixed on the copy paper sheet P by the fixing unit 60, the copy paper sheet P is delivered onto the finisher 150 through the delivery port 61 by a feed roller pair 68 and a delivery roller pair 69.

An automatic double-side device 70 for reversing the copy paper sheet P which has passed through the fixing unit 60 and feeding it to the resist roller pair 65 again is arranged under the convey path 58. The automatic double-side device 70 comprises a temporary stack 71 for temporarily stacking the copy paper sheets P, a reversing path 72 branched from the convey path 58 to reverse the copy paper sheet P which has passed through the fixing unit 60 and guide the copy paper sheet P to the temporary stack 71, pickup rollers 73 for extracting the copy paper sheets P stacked on the temporary stack one by one, and a feed roller 75 for feeding the extracted paper sheet to the resist roller pair 65 through a convey path 74. A selector gate 76 for selectively distributing the copy paper sheets P to the delivery port 61 or reversing path 72 is arranged at the branch portion between the convey path 58 and reversing path 72.

For double-side copying, the copy paper sheet P which has passed through the fixing unit 60 is guided to the reversing path 72 by the selector gate 76, temporarily stacked on the temporary stack 71 in a reversed state, and fed to the resist roller pair 65 through the convey path 74 by the pickup rollers 73 and feed roller 75. The copy paper sheet P is aligned by the resist roller pair 65 and fed to the transfer section again to transfer a toner image onto the blank surface of the copy paper sheet P. After this, the copy paper sheet P is delivered to the finisher 150 through the convey path 58, fixing unit 60, and delivery rollers 69.

The finisher 150 staples delivered copies of documents in units of copies. Every time a copy paper sheet P to be stapled is delivered from the delivery port 61, a guide bar 151 aligns the copy paper sheet P to the stapling side. When all paper sheets are delivered, a copy of copy paper sheets P is pressed by a paper press arm 152 and stapled by a stapler unit (not shown).

After this, the guide bar 151 moves downward. The stapled copy paper sheets P are delivered to a finisher delivery tray 154 by a finisher delivery roller 155 in units of copies. The downward moving amount of the finisher delivery tray 154 is roughly determined in accordance with the number of copy paper sheets P to be delivered, so the finisher delivery tray 154 moves downward stepwise every time one copy is delivered. The guide bar 151 for aligning the delivered copy paper sheets P is located at a position where the guide bar 151 does not abut against the already stapled copy paper sheets P placed on the finisher delivery tray 154.

The finisher delivery tray 154 is connected to a shift mechanism (not shown) which shifts (e.g., in four directions: front, rear, left, and right sides) in units of copies in the sort mode. This shift mechanism is used to discriminate the delivery position of paper sheets printed in a memory full state for facsimile reception from that of copy paper sheets which have already been printed by copying operation. To discriminate a copy output from a facsimile output, paper sheets may be delivered in directions rotating through 90° with respect to each other.

An operation panel for inputting various copy conditions and a copy start signal for starting the copying operation is arranged at the upper portion on the front side of the apparatus main body 10. The indicator section and operation key arrangement of this operation panel will be described with reference to FIG. 2.

Figure 2:
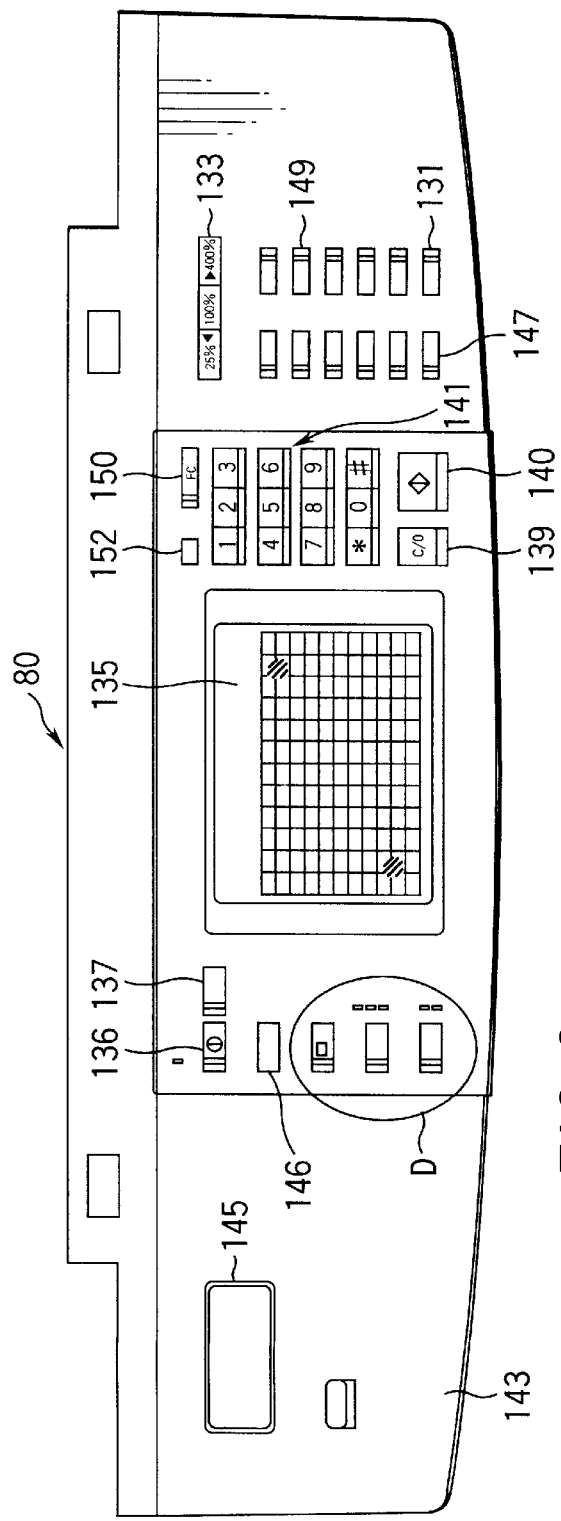
FIG. 2 is a plan view of an operation panel arranged on the image forming apparatus shown in FIG. 1.

FIG. 2 shows the arrangement of an operation panel 80 as an operation means. The operation panel 80 has a HELP key 146, an automatic paper selection key 131, an automatic magnification selection key 147, a zoom/100% key 133, paper size keys 149, an LCD panel 135, a preheat key 136, an interrupt key 137, an all clear key 150, a clear/stop key 139, a start key 140, a ten-key pad 141, a pause key 152, a total counter indicator 143, a clip tray 145, and the like.

Figure 3:
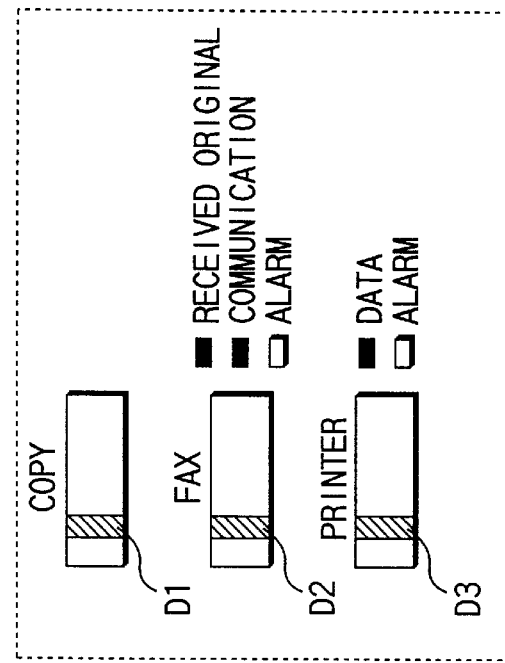
FIG. 3 is an enlarged view of some operation keys shown in FIG. 2.

Three indicators indicated by a circle D comprise an indicator D1 for indicating the copy state, an indicator D2 for indicating the presence of a facsimile reception original, a communicating state, and an alarm operating state, and an indicator D3 for indicating the presence of printer data and an alarm state, as shown in FIG. 3.

The LCD panel 135 indicates the set state of the operation mode of the copying machine by blinking/displaying various characters and icons.

When the HELP key 146 is depressed as an operation guide key, a message representing the operation procedure is displayed on the LCD panel 135. When the HELP key 146 is depressed after functions are set, the set contents can be confirmed on the LCD panel 135.

The automatic paper selection key 131 is normally set in an automatic paper selection mode. The size of an original set on the original table (glass) 5 is automatically detected, and paper sheets having the same size as that of the original are automatically selected (for only a copy magnification of ×1).

When the automatic magnification selection key 147 is depressed to select an automatic magnification selection mode and set a desired paper size, the size of an original set on the original table (glass) 5 is detected, and the copy magnification is automatically calculated.

When the "25%<" key at the left end of the zoom/100% key 133 is depressed, the copy magnification decreases to 25% in units of 1%. When the ">800%" key at the right end is depressed, the copy magnification increases to 800% in units of 1%. When the "100%", key at the center is depressed, the copy magnification returns to "×1" (100%).

The paper size key 149 is used to select a paper size.

The LCD panel 135 displays the state of the digital copying machine 1, operation procedure, and various instructions for the user as characters and icons. The LCD panel 135 as a display means also incorporates a touch panel to allow function setting.

When the preheat key 136 is depressed, a preheat (power saving) mode is set, and all indicator lamps are turned off. To set the copy mode again, this button is depressed again.

The interrupt key 137 is used for an interrupt copy during continuous copying or interrupt of a facsimile reception job and a copy job (to be described later).

When the all clear key 150 is depressed, all selected modes are cleared, and the initial state is restored.

The clear/stop key 139 is used to correct the number of copies or stop the copying operation.

The start key 140 is depressed to, e.g., start copying.

The ten-key pad 141 is used to set the number of copies. The number of copies can be set within the range of 1 to 999.

The pause key 152 is an operation button for inserting a pause between dial inputs in ten-key input for the facsimile operation.

The total counter indicator 143 indicates the total copy volume after machine setting.

The clip tray 145 is a place where clips taken off from originals to be copied are placed and has a magnet.

The control circuit of the image forming apparatus shown in FIG. 1 will be described next with reference to FIGS. 4 and 5.

Figure 4:
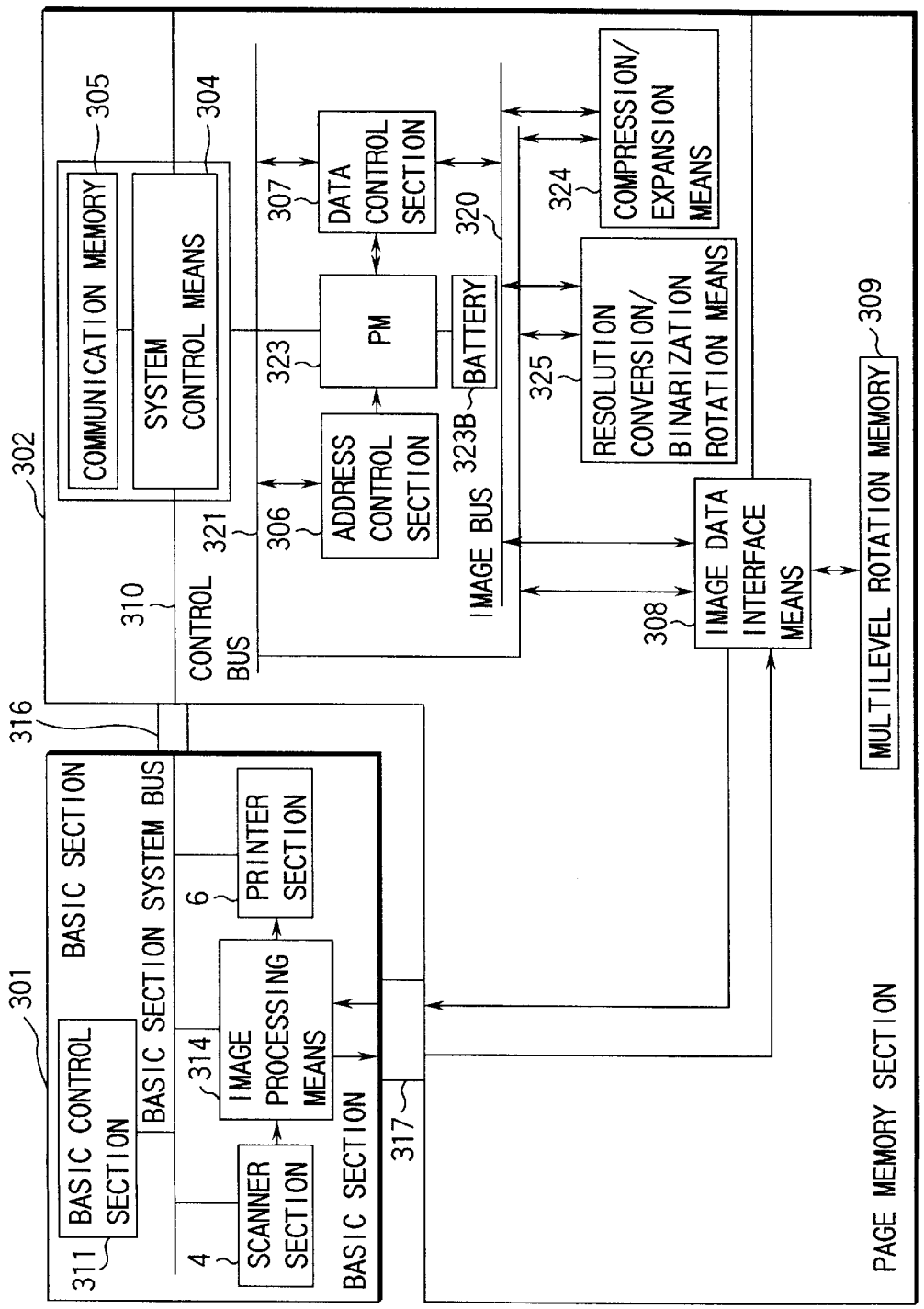
FIG. 4 is a block diagram showing the functional arrangement of the image forming apparatus shown in FIG. 1.

FIG. 4 is a schematic view of the block diagram of the control system of the entire digital copying machine with a facsimile function shown in FIG. 1. FIG. 5 is a block diagram showing the detailed arrangement of a basic control section shown in FIG. 4.

As shown in FIG. 4, the control system of the digital copying machine roughly has two blocks and comprises a basic section 301 constructing the basic configuration section of the digital copying machine controlled by a basic control section 311, in which the scanner section 4 and printer section 6 are connected through an image processing means 314, and a page memory section 302 for receiving and storing image data from the basic section 301 and transferring the stored image data again to the basic section 301 to realize memory copy (electronic sort).

The basic section 301 and page memory section 302 are connected through a basic section system interface 316 for transferring control data, and a basic section image interface 317 for transferring image data.

The basic section 301 comprises the scanner section 4 as an input means, printer section 6 as an output means, image processing means 314, and basic control section 311 including a CPU as a control means for controlling the scanner and printer sections and image processing means. The above-described paper jam sensor sends a paper jam detection output to a printer CPU (not shown) in the printer section 6. The printer CPU performs processing for paper jam together with a main CPU (to be described later) incorporated in the basic control section 311 in response to the sensor output. This paper jam processing will be described later in detail.

Figure 5:
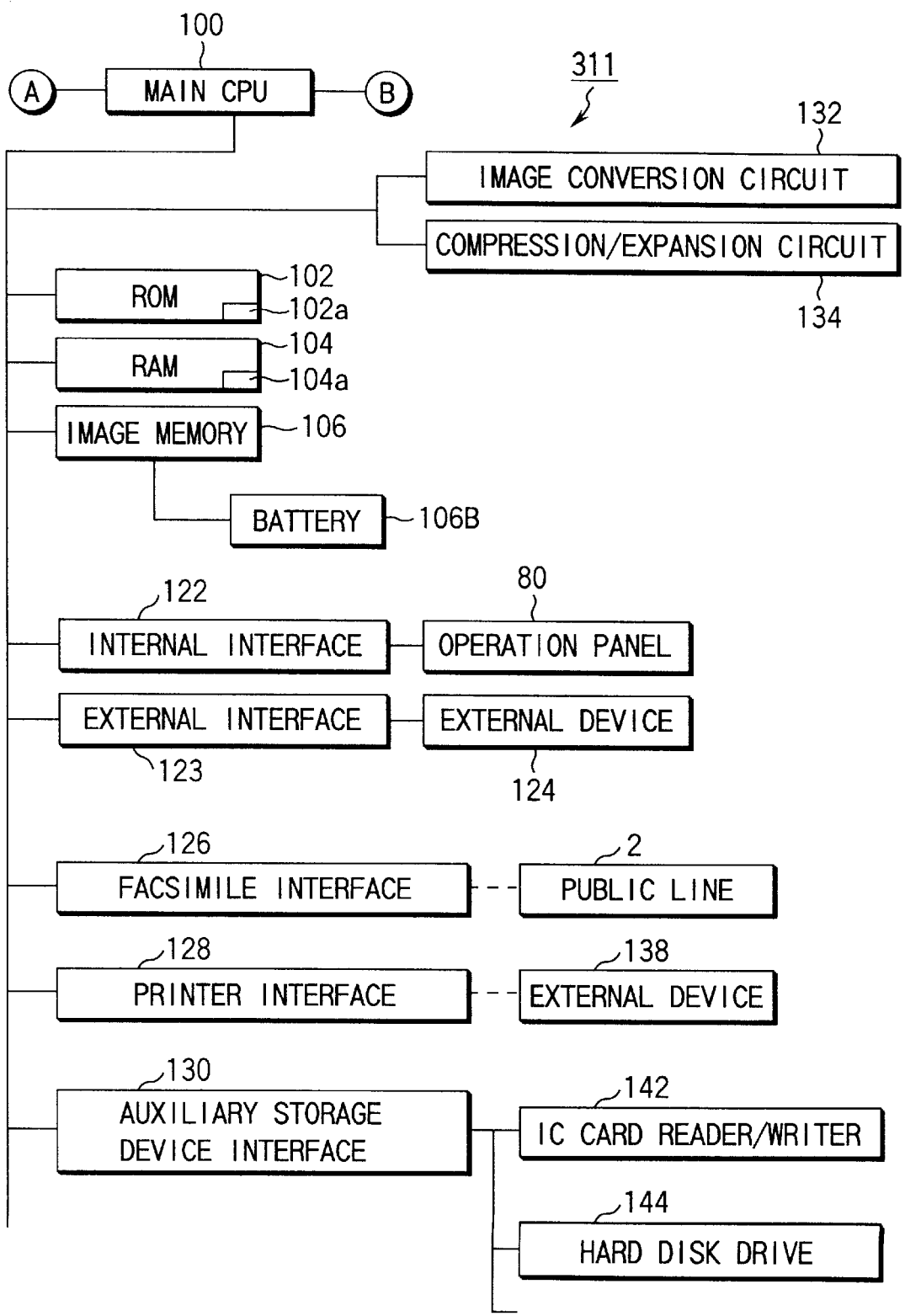
FIG. 5 is a block diagram showing the internal arrangement of a basic control section shown in FIG. 4.

As shown in FIG. 5, a main CPU 100 of the basic control section 311 is connected to a ROM 102, a RAM 104, an image memory 106, an internal interface 122, an external interface 123, a facsimile interface 126, a printer interface 128, an auxiliary storage device interface 130, an image conversion circuit 132 for enlarging or reducing binary image data, and a compression/expansion circuit 134 for compressing or expanding image data.

The image memory 106 is backed up by a battery 106B to prevent stored contents from being lost in the power OFF state.

Figure 6:
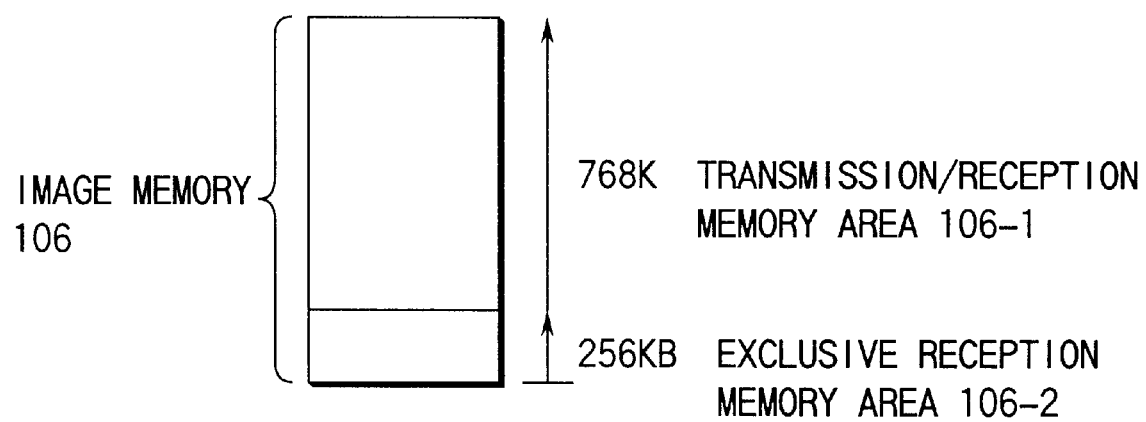
FIG. 6 is a view showing the internal arrangement of an image memory shown in FIG. 5.

As shown in FIG. 6, the image memory 106 has a transmission/reception memory area 106-1 and an exclusive reception memory area 106-2 which have capacities of, e.g., 768 KB and 256 KB, respectively. The transmission/reception memory area 106-1 is used to, e.g., temporarily store the image data of a transmission original document read by the scanner section 4 in a transmission reservation mode.

The exclusive reception memory area 106-2 is prepared to continue reception even when the transmission/reception memory area 106-1 becomes full, and use of the exclusive reception memory area 106-2 is inhibited in the transmission mode.

The internal interface 122 is connected to the above-described operation panel 80. The external interface 123 is connected to an external device 124. The facsimile interface 126 is connected to a public line 2 such as a telephone line. The printer interface 128 is connected to an external device 138. The auxiliary storage device interface 130 is connected to an IC card reader/writer 142, a hard disk drive 144, and the like.

The facsimile interface 126 includes a modem for communication with the public line 2, an NCU as an interface for connection to the public line 2, and the like.

In this arrangement, when image data of a document or the like is to be transmitted using the facsimile function, the main CPU 100 stores the image data of a document read by the scanner section 4 in the image memory 106. The stored image data is enlarged or reduced by the image conversion circuit 132 as needed in accordance with the paper size at the transmission destination. The image data whose size has been converted is coded by the compression/expansion circuit 134 and then transmitted to the external device at the transmission destination through the facsimile interface 126 and public line 2.

To receive image data from an external device using the facsimile function, a facsimile CFU (not shown) connected to the main CPU 100 stores image data supplied from an external device at the transmission source through the public line 2 and facsimile interface 126 in the image memory 106. The stored image data is decoded by the compression/expansion circuit 134, stored in the image memory 106, and output to the printer section 6.

An image data storage/read for the copying operation is performed by the main CPU 100. For example, to store image data, image data read by the scanner section 4 is stored in the image memory 106 in accordance with an instruction from the main CPU 100. The main CPU 100 issues an instruction in accordance with a mode determined by mode designation key input from the operation panel 80.

A parameter table 104a is set in the RAM 104. The parameter table 104a stores various conditions set by key operations on the operation panel 80. Default values stored in, e.g., the ROM 102 correspond to unset conditions. Parameters to be set as conditions are image processing parameters in the copy mode, various setting conditions, ON/OFF of the magnification setting function, telephone numbers registered as transmission destinations, and the like.

The page memory section 302 will be described next with reference to FIG. 4. The page memory section 302 controls access from the basic section 301 to a page memory (PM) 323. The page memory section 302 comprises a system control means 304, the storage means (page memory) 323 for temporarily storing image data, an address control section 306 for generating an address of the page memory 323, an image bus 320 used for data transfer between the respective devices in the page memory section 302, a control bus 321 used to control signal transfer between the respective devices in the page memory section 302 and the system control means 304, a data control means 307 for controlling data transfer in data transfer between the page memory 323 and another device through the image bus 320, an image data interface (I/F) 308 for interfacing image data in image data transfer between the basic section 301 and page memory section 302 through the basic section image interface 317, a resolution conversion/binarization rotation means 325 for, when image data is to be transmitted to a device with a different resolution, converting the image data in accordance with the resolution of this device, converting image data received from a device with a different resolution in accordance with the resolution of the printer section 6 of the basic section 301, or executing 90° rotation processing of binary image data, a compression/expansion means 324 for compressing input image data for a device for compressing image data and transmitting or storing it as in facsimile transmission or optical disk storage, or expanding compressed image data to make it visible through the printer section 6, and a multilevel rotation memory 309 connected to the image data I/F 308 and used to output the image data while rotating it through 90° or −90°.

Like the image memory 106, the page memory 323 is backed up by a battery 323B. Instead the battery 323B, the battery 106B for the image memory 106 may be used such that the two memories are backed up by a common battery.

The facsimile reception operation of the image forming apparatus with a facsimile function having the above arrangement will be described in detail with reference to FIGS. 6 to 13.

Figure 7:
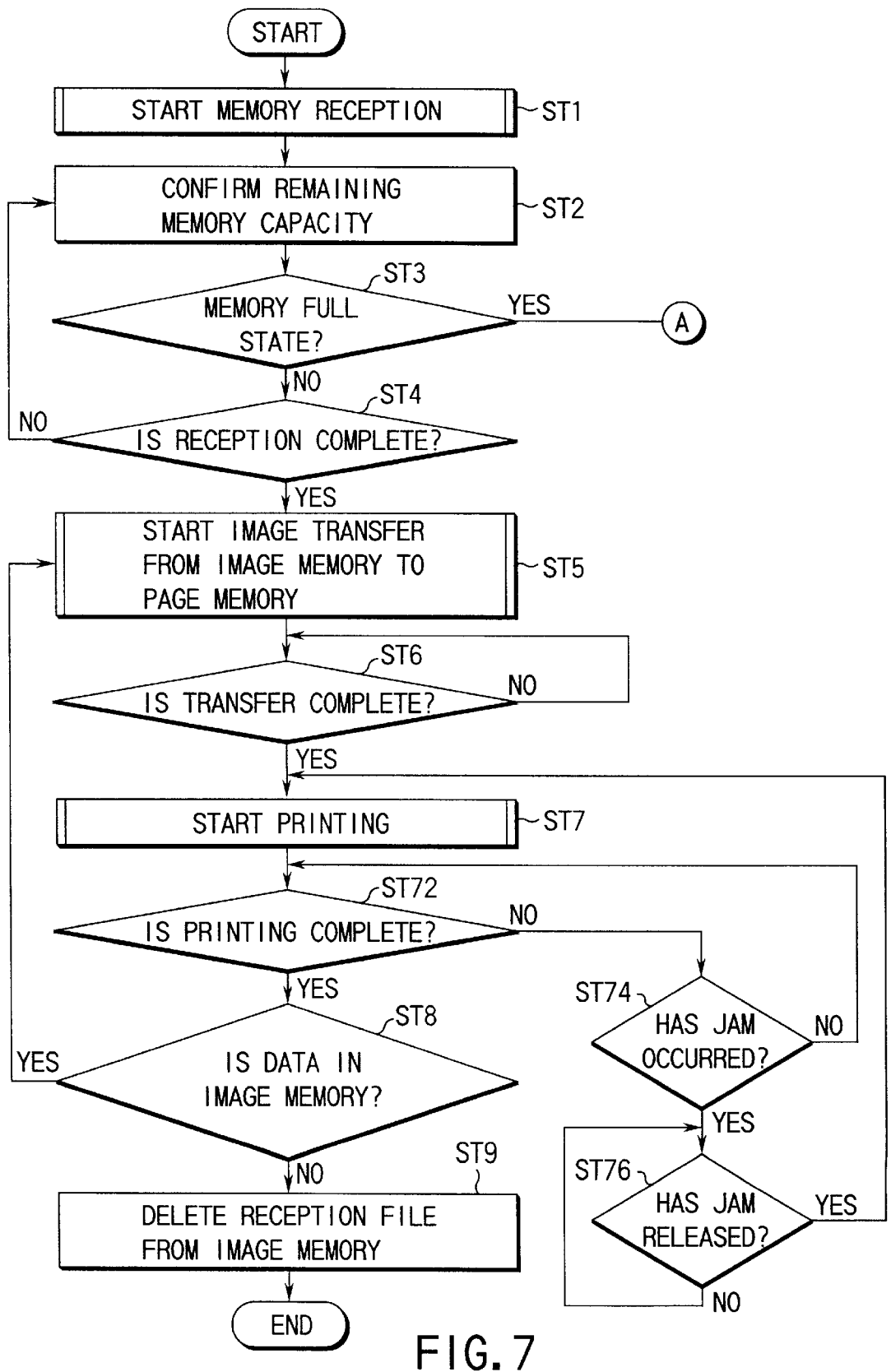
FIG. 7 is a flow chart showing the operation of the image forming apparatus having the arrangement. shown in FIGS. 1 to 6.

When the facsimile reception mode is set by operation on the operation panel 80, and a facsimile signal is received from an external device through the public line 2, memory reception start processing (ST1) in FIG. 7 is executed.

Figure 10:
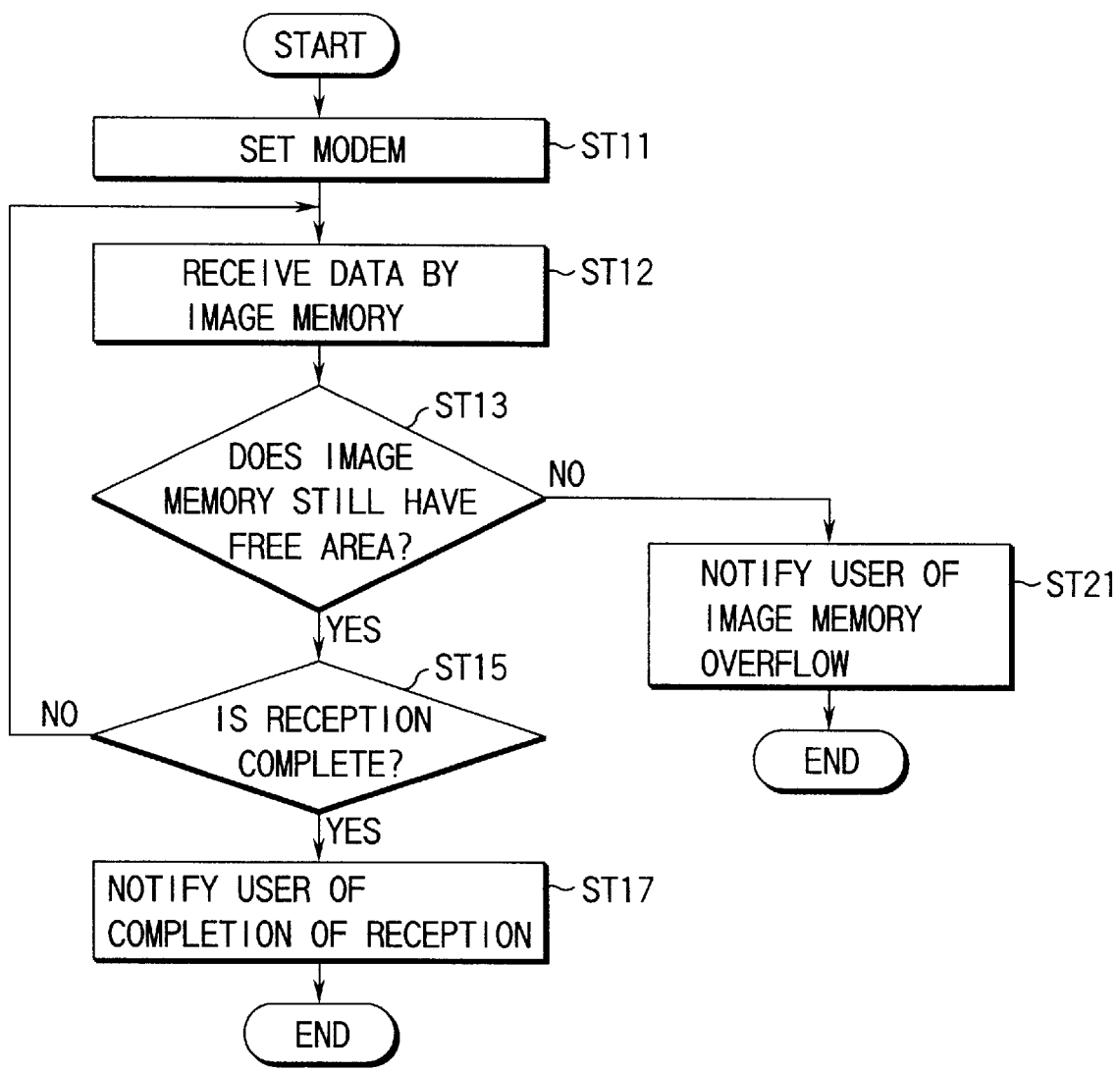
FIG. 10 is a flow chart showing the contents of the start of memory reception.

With this processing, the modem is set in ST11 in FIG. 10. The facsimile signal is demodulated by a modem incorporated in the facsimile interface 126 and received by the image memory 106 in FIG. 5 (ST12).

It is checked whether the image memory 106 still has a capacity (ST13). If YES in ST13, reception is continued (ST12). When the reception state is ended (ST15), the user is notified of the end of reception (ST17).

If it is determined in ST13 that the image memory 106 has no remaining capacity, the flow advances to ST21 to end the processing.

The facsimile signal received in this way is stored in the image memory 106 as compressed data.

Referring back to the flow in FIG. 7, when the start of memory reception (ST1) is ended, the remaining capacity of the image memory 106 is confirmed in the next step ST2. If the memory is not full, the flow advances from step ST3 to ST4 to check whether reception is ended. If YES in ST4, the flow advances to ST5 to start transfer processing from the image memory 106 to the page memory 323 for image data printing (ST6).

Figure 11:
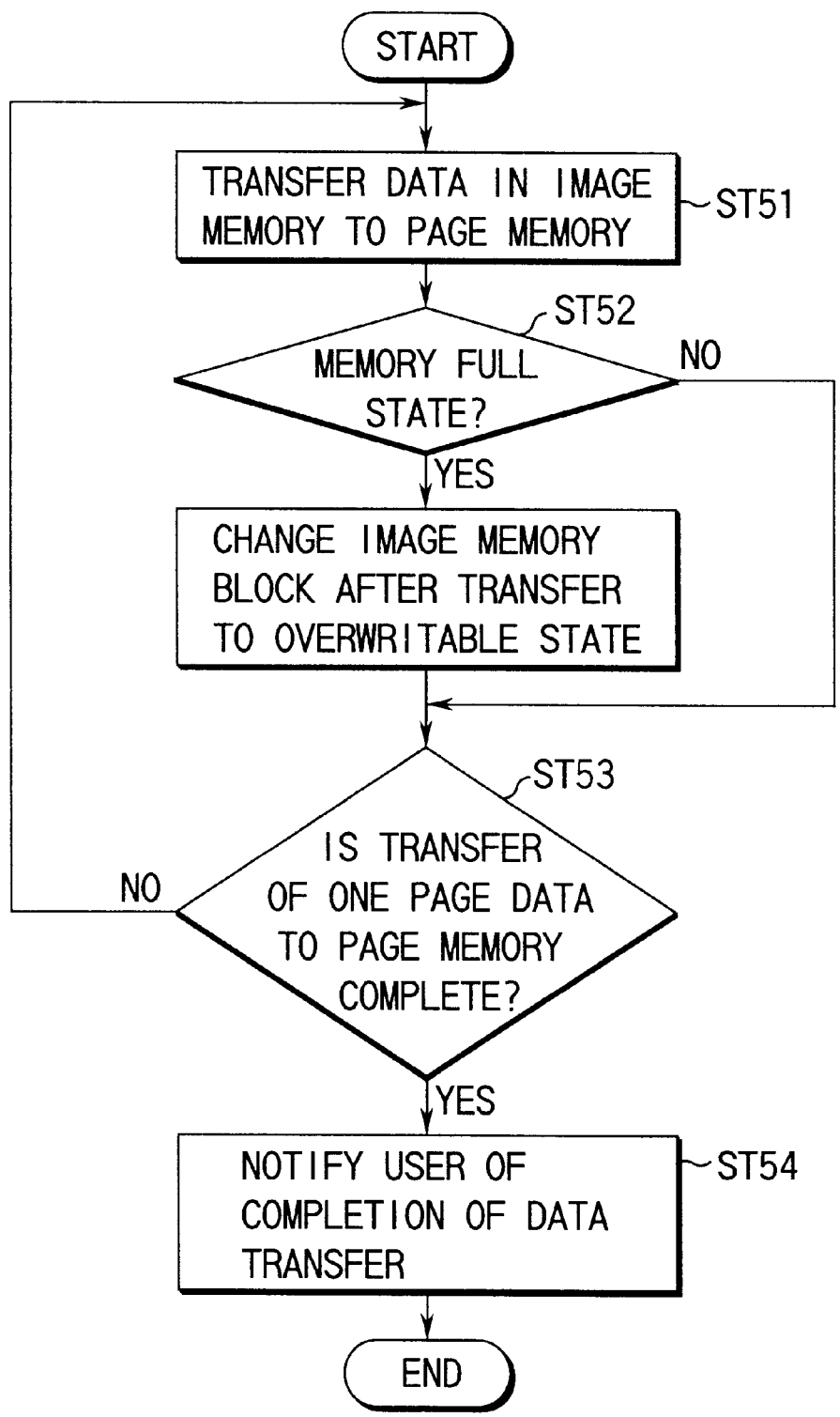
FIG. 11 is flow chart showing the start of transfer of image data from the image memory to the page memory.

This transfer processing from the image memory 106 to the page memory 323 for image data printing will be described with reference to FIG. 11.

First, in step ST51, compressed data in the image memory 106 is expanded by the compression/expansion means 324 and transferred to the page memory 323 as raw data. At this time, the memory full state of the image memory 106 is monitored (ST52). If the memory is not full, it is checked in step ST53 whether transfer of one page is complete. If transfer is complete, a transfer completion notification is output, and processing is ended (ST54).

When the memory full state is detected in step ST52, a memory block of the image memory 106 where transfer is complete is changed to an overwritable state (ST55). The flow advances to step ST53 to check completion of transfer of one page.

The operation in FIG. 11 will be described in more detail with reference to FIGS. 9A to 9C. Referring to FIG. 9A, reception image data is already stored in an area A1 of the exclusive reception memory area 106-2 of the image memory 106 while there is little free area A2, so the memory full state is detected in step ST52.

In this state, the image data indicated by a broken line at the end of the area Al is block-transferred to the free area of the page memory 323 shown in FIG. 9B. As a result, as shown in FIG. 9C, an area A3 where the overwrite is enabled by data transfer to the page memory 323 is formed in the exclusive reception memory area 106-2 of the image memory 106.

The image data in the area A3 is lost when image data from an external device is overwritten, though image identical to the lost data has already been transferred to the page memory 323. Since this page memory 323 is backed up by the battery 323B, the image data is held in the page memory 323 without being lost even when the power is turned off in this state.

In this way, when image data transfer processing (ST5) from the image memory 106 to the page memory 323 is started, it is checked in step ST6 in FIG. 7 whether transfer is complete. If complete of transfer is detected, the next printing processing is driven (ST7).

Figure 12:
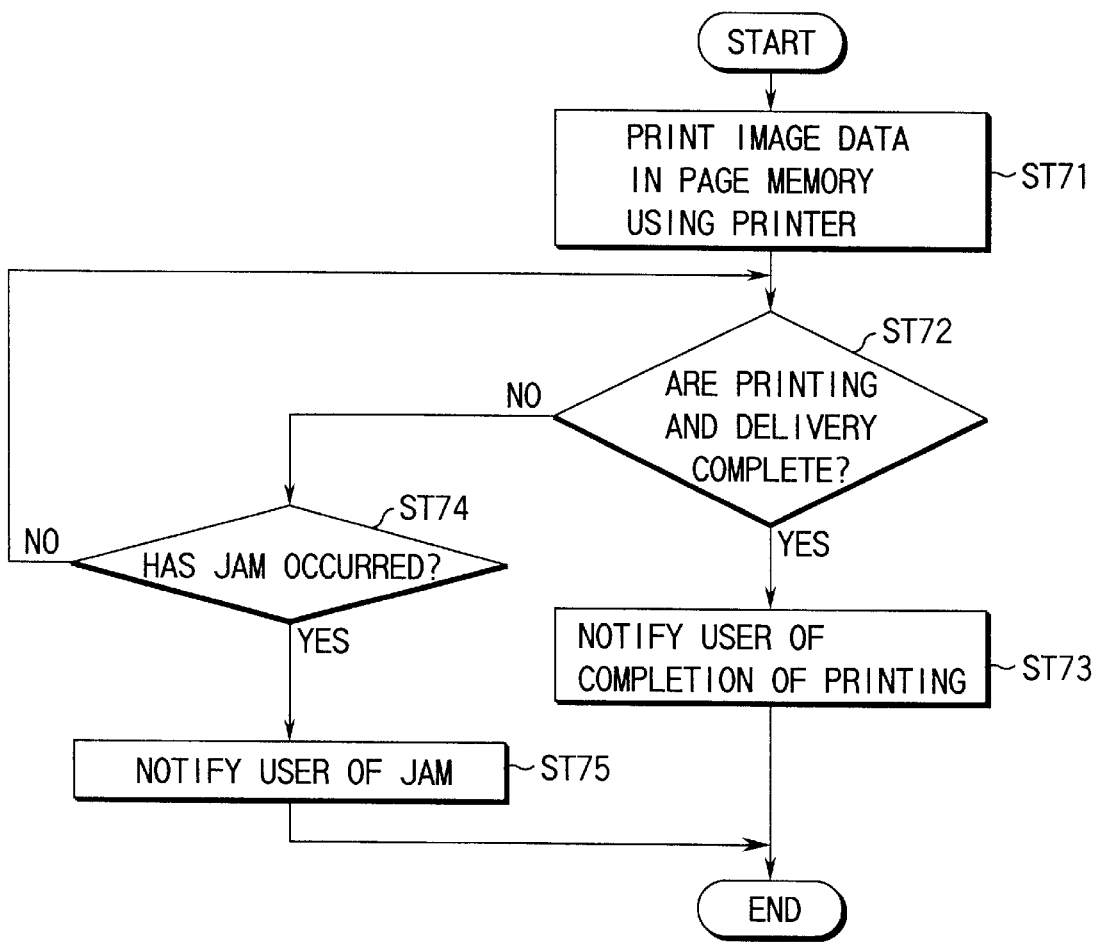
FIG. 12 is a flow chart showing the start of printing.

In printing processing, as shown in FIG. 12, the image data stored in the page memory 323 is sent from the data control means 307 to the image data I/F 308 through the image bus 320 and then sent to the printer section 6 to execute printing processing (ST71).

The image data is sent from the image memory 106 to the page memory 323 in units of blocks and sequentially printed. Completion of printing and delivery of printed paper sheets are checked in step ST72. If printing is complete, a printing completion notification is output (ST73).

If it is determined in ST72 that delivery of paper sheets is not complete, it is checked in ST74 whether paper jam (jam) has occurred. If NO in ST74, the flow returns to ST72. If YES in ST74, jam notification processing for the operator is performed in ST75, and processing is ended.

If it is determined in the flow in FIG. 7 that printing is not complete (ST72), a jam is checked in ST74. If YES in ST74, it is checked whether jam cancel processing has been performed by the operator in response to jam notification processing for the operator in ST75 (ST76). After cancel, the flow returns to printing start processing in ST7.

When completion of printing is detected (ST72), it is checked whether image data still remains in the image memory 106 (ST8). If no image data remains, the reception file is deleted from the image memory 106 (ST9), and processing is ended.

When completion of printing is detected in ST72, the printing completion notification is sent to the main CPU 100, and the image data sent from the image memory 106 to the page memory 323 in units of blocks is finally erased from the page memory 323. Even when data transfer stops midway due to paper jam or the like when the image data stored in the page memory 323 is being sent to the printer section 6, the block data stored in the page memory 323 is held in the page memory 323 until printing is complete. Hence, when the paper jam is eliminated, printing can be satisfactorily continued by sending the block data stored in the page memory 323 to the printer section 6 again.

Figure 8:
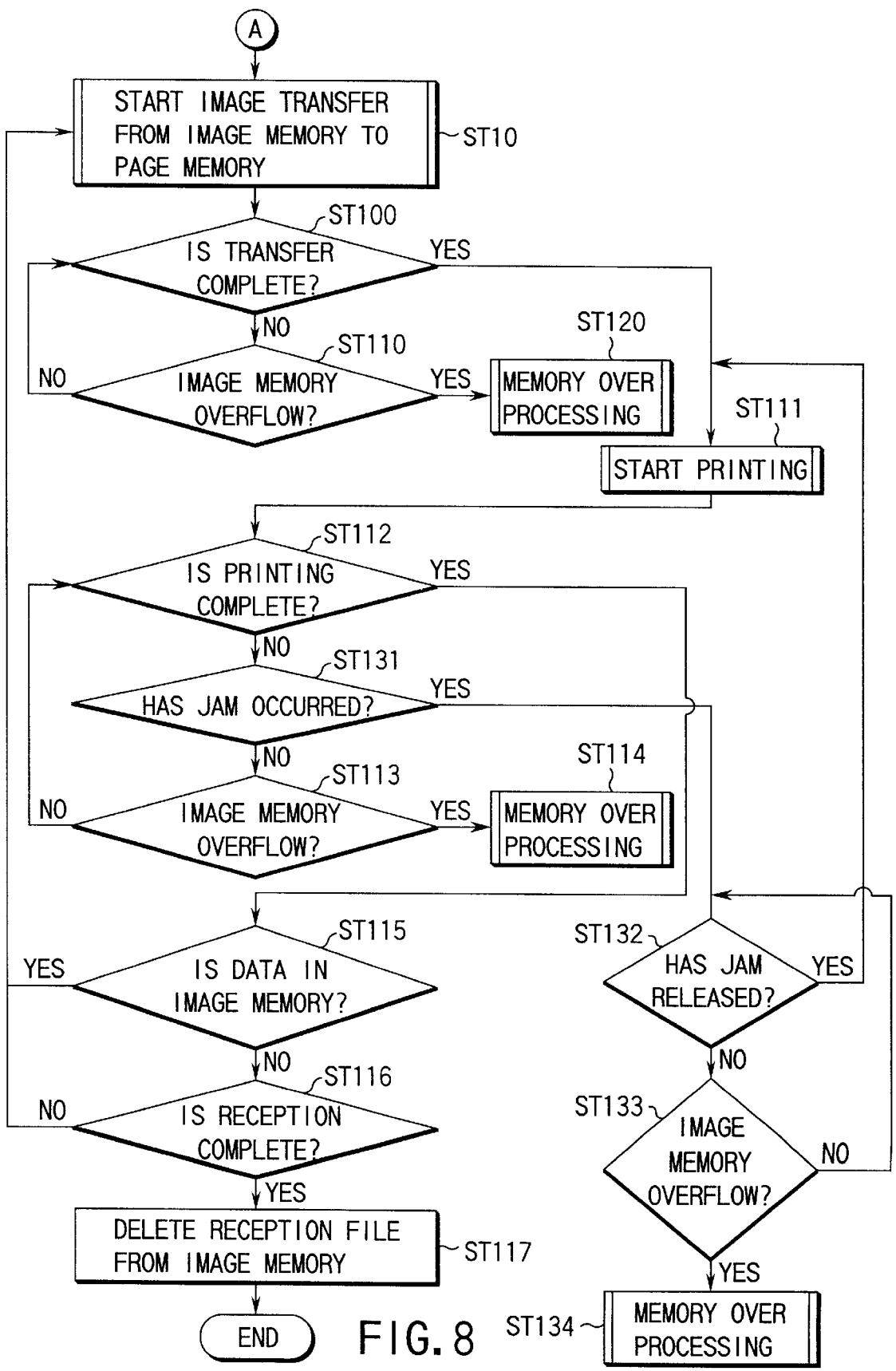
FIG. 8 is a flow chart showing the operation of the image forming apparatus having the arrangement shown in FIGS. 1 to 6.

When the memory full state is detected in step ST3 before reception is complete, the flow advances to ST10 in FIG. 8 to start image data transfer processing from the image memory 106 to the page memory 323. This transfer processing has the same contents as in step ST5.

When completion of transfer is detected (ST100), printing processing is started, as in step ST7 (ST111).

If overflow of the image memory 106 is detected in ST110 before transfer is complete, memory over processing is executed (ST120).

Figure 13:
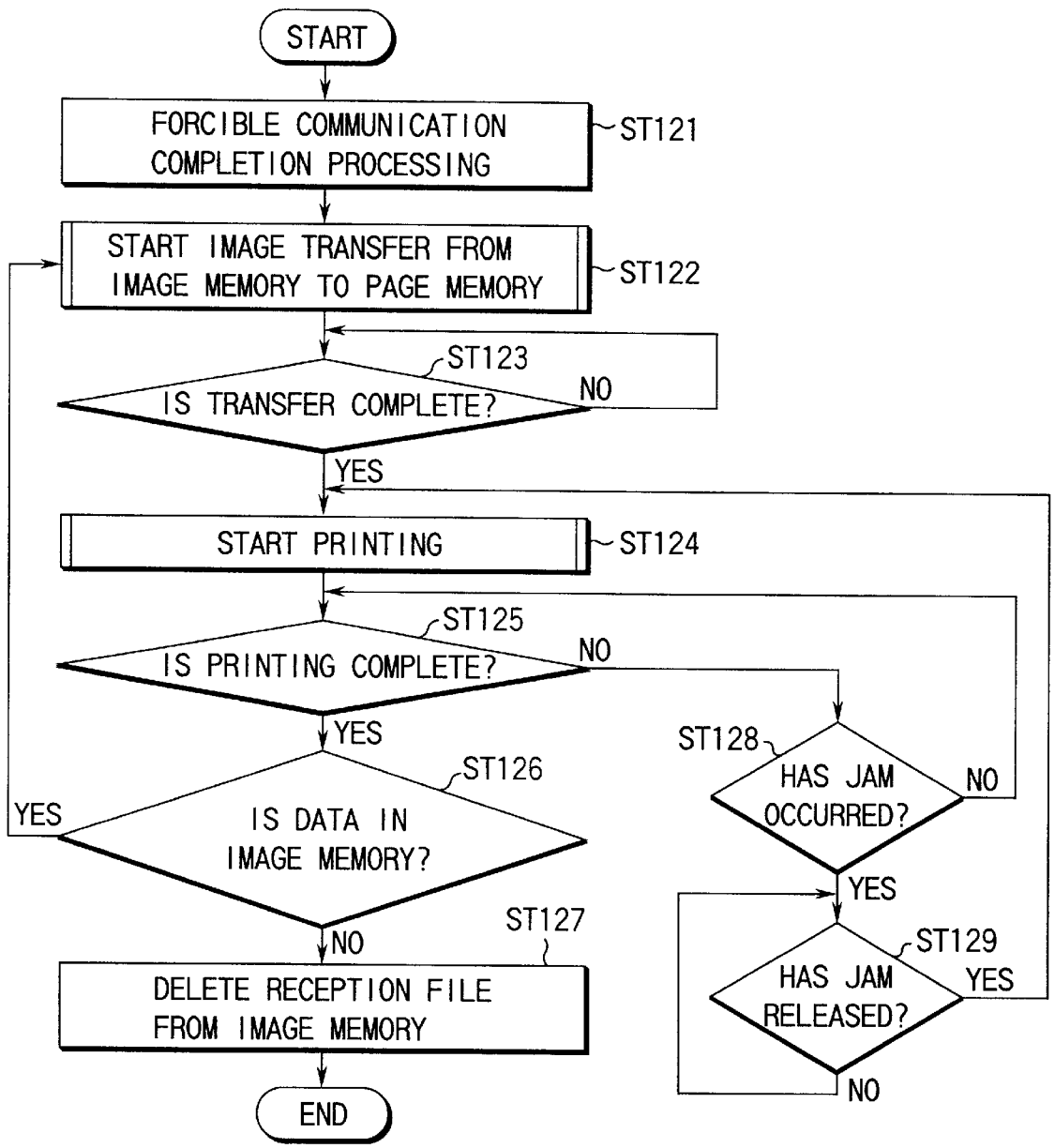
FIG. 13 is a flow chart showing memory over processing.

This memory over processing will be described in detail with reference to FIG. 13. When overflow of the image memory 106 occurs in the memory full state, processing of forcibly ending communication is performed in step ST121. As a consequence, an error signal is sent from, e.g., the public line 2 to the device at the transmission source.

After this, processing of transferring already received image data in the image memory 106 to the page memory 323 is started (ST122). This image transfer start processing has already been described in association with step ST5 or ST10, and a detailed description thereof will be omitted.

Completion of transfer is checked in ST123. If YES in ST123, printing processing is started in the next step ST124. This printing processing has also already been described in association with step ST7.

Subsequently, completion of printing is checked in step ST125. If YES in ST125, it is checked in step ST126 whether data still remains in the image memory 106. If data remains, the flow returns to step ST122 to continue image transfer. If no data remains, the flow advances to step 127 to delete the reception file from the image memory 106, and processing is ended.

If completion of printing is not detected in step ST125, it is checked in ST128 whether jam has occurred. If no jam has occurred, the flow returns to ST124. If jam has occurred, the flow advances to ST129 to check whether jam cancel processing by the operator has been performed. When jam has been canceled, the flow returns to printing start processing (ST124).

Referring back to FIG. 8, printing processing is started in step ST111. It is checked whether printing is complete (ST112). Before completion, jam occurrence is checked in step ST131. If no jam has occurred, it is monitored in step ST113 whether the image memory 106 is in the overflow state.

In the overflow state, the flow advances to step ST114 to execute memory overflow processing as in step ST120.

When it is detected in step ST131 that jam has occurred, it is checked in the next step ST132 whether jam cancel processing is complete. If YES in ST132, the flow returns to printing start processing (ST111).

Before jam cancel is complete, the memory over state of the image memory 106 is checked in ST133. If the memory over state is not detected, monitoring is continued until jam cancel is complete in ST132. In the memory over state, the flow advances to ST134 to execute memory over processing.

If it is detected in step ST112 that printing is complete, it is checked in ST115 whether data still remains in the image memory 106. If NO in ST115, it is checked whether reception is complete (ST116). If YES in ST116, the flow advances to step 117 to delete the reception file from the image memory 106, and processing is ended.

In the above description, when the memory full state is detected during facsimile reception, a printing start request is issued. At this time, if paper jam, i.e., jam has occurred, processing is executed while determining that printing is disabled. However, the facsimile reception printing disable state is determined not only based on paper jam but also when the printer is already performing the copying operation.

In the present invention, a composite image forming apparatus is constructed such that even when the facsimile reception printing disable state is determined because the printer is already performing the copying operation, facsimile reception printing can be started, and even when the memory full state is detected during facsimile reception, the facsimile reception can be continued without immediately disconnecting the line. An embodiment thereof will be described below with reference to FIGS. 14 to 17.

Figure 14:
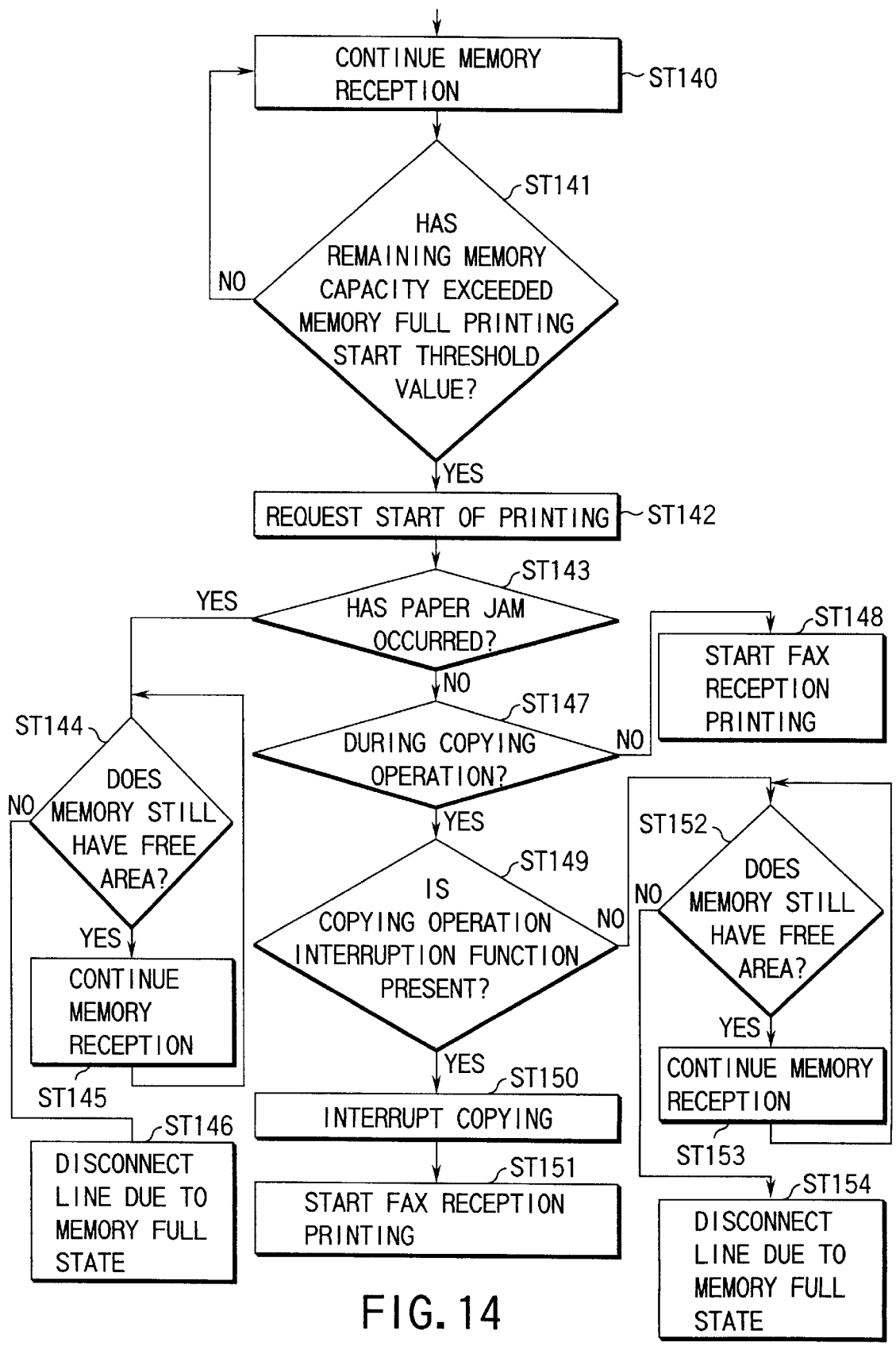
FIG. 14 is a flow chart showing the operation of the embodiment of the present invention.

When the image forming apparatus is set in the facsimile reception mode, memory reception by a reception image memory formed from the image memory 106 is continued in ST140 in FIG. 14. In this state, it is continuously checked in ST141 whether the remaining memory capacity has a predetermined value or less, i.e., exceeds a predetermined memory full printing start threshold value. If YES in ST141, the flow advances to ST142, and a printing start request is output from the facsimile CPU to the printer CPU.

Figure 15:
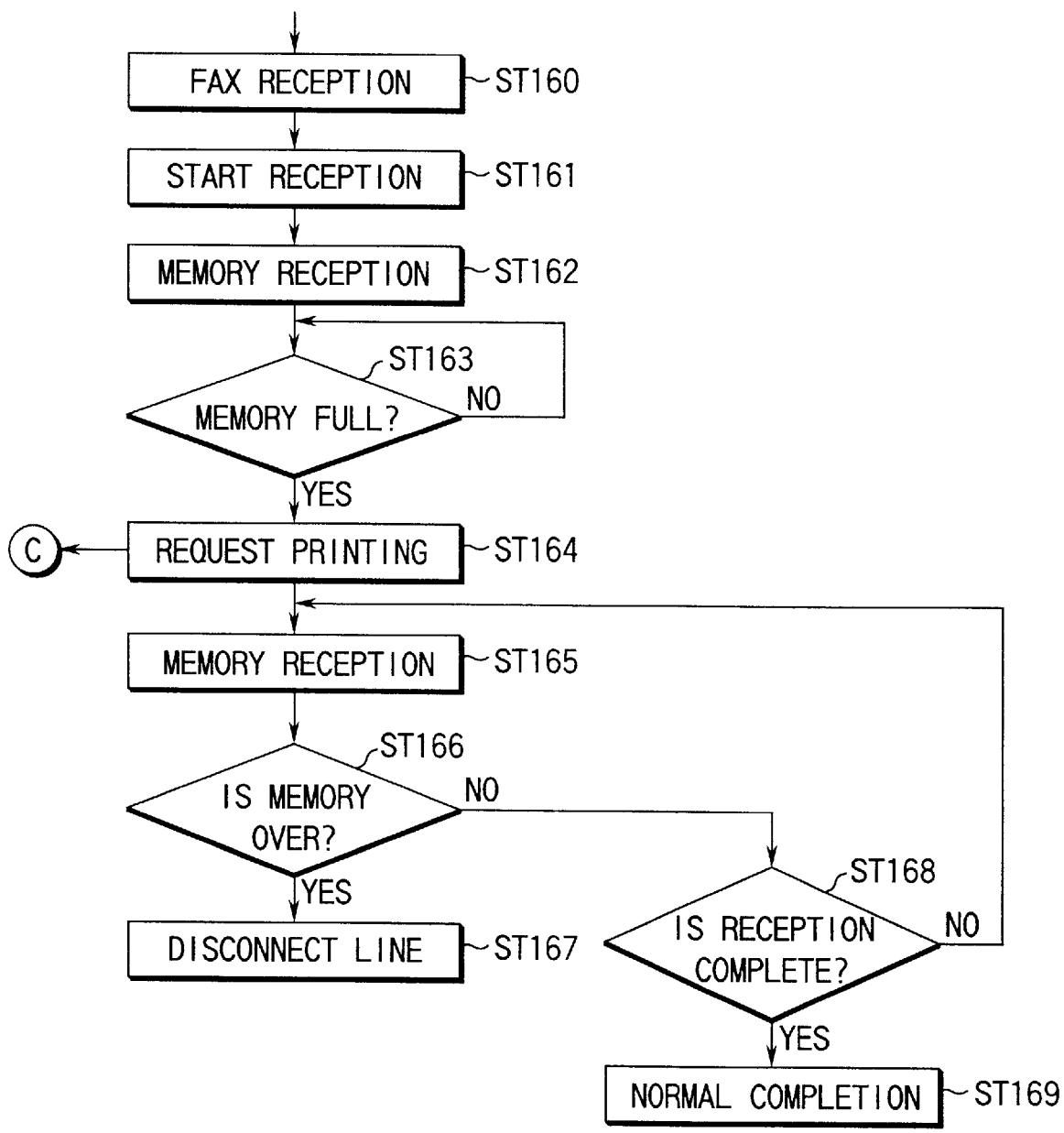
FIG. 15 is a flow chart showing the operation of a facsimile CPU in FIG. 14 in detail.

The operation flow of the facsimile CPU will be described with reference to FIG. 15. Referring to FIG. 15, when the facsimile reception mode is set in ST160, reception of a facsimile signal is started in ST161, and the memory reception operation is executed in ST162.

Figure 16:
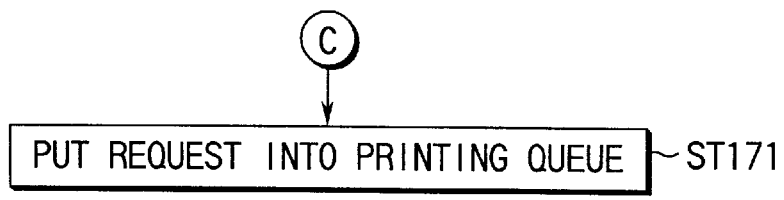
FIG. 16 is a flow chart of the operation of a printer CPU for receiving a printing request issued in FIG. 15.

In this state, the memory full state is monitored in ST163. If the memory full state is detected, a printing request for the printer is issued in ST164. This printing request is sent to the printer CPU. As shown in FIG. 16, the printer CPU checks in ST170 whether a printing request is present. If YES in ST170, this request is recorded in a printing queue for sequentially storing printing requests in ST171.

Referring back to FIG. 15, even after the printing request is issued in ST164, memory reception is continuously performed in ST165 independently of the result of the printing request. The memory over state is checked in ST166. If the memory over state is detected, the line is disconnected in ST167. If no memory over state is detected, and completion of reception is detected in ST168, the facsimile reception is normally ended in ST169.

Figure 17:
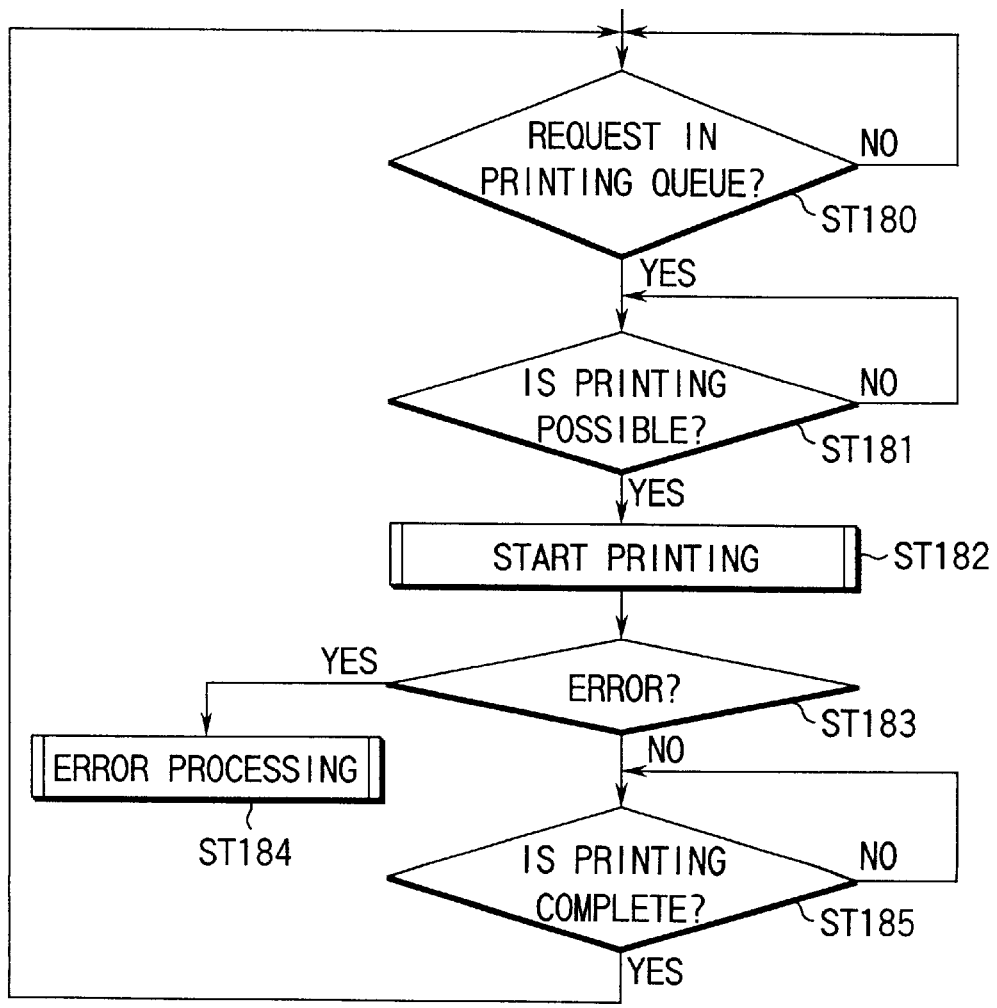
FIG. 17 is a flow chart of the operation of a printer CPU for receiving a printing request issued in FIG. 16.

The operation flow of the printer CPU will be described with reference to FIG. 17. The printer CPU checks in ST180 whether a printing request is present in the printing queue described with reference to FIG. 16. If YES in ST180, it is checked in ST181 whether printing can be performed. If YES in ST181, a printing start operation is performed in ST182.

After the start of printing, errors such as paper jam are monitored in ST183. If YES in ST183, the above-described error processing is executed in ST184. If NO in ST183, the flow returns to ST180 to check whether the next printing request is present. If YES in ST180, the processing is continued.

Referring back to FIG. 14, when a printing request is issued in ST142, it is checked in ST143 whether paper jam has occurred at that time. If paper jam has occurred, the remaining memory capacity is checked in ST144. If the memory capacity remains, memory reception is continued in ST145. If no memory capacity remains, line disconnection processing is executed in ST146, as described with reference to FIG. 15.

When a printing request is issued, and it is determined in ST143 that no paper jam has occurred, and printing can be normally performed, it is checked in ST147 whether the copying operation is being performed. If NO in ST147, facsimile reception printing is started in ST148.

If YES in ST147, it is checked in ST149 whether a copying operation interruption function is present. If YES in ST149, an interrupt is automatically generated to interrupt the copying operation in ST150. Facsimile reception printing is started in ST151. This interrupt is automatically started. Alternatively, a message for asking the operator for the interruption of copying operation is displayed on the display screen 135 of the operation panel 80, and an interrupt is generated in response to the operator's operation of the interrupt key 137. When facsimile reception printing is complete in ST151, the interrupt is ended, and the interrupted copying operation is resumed.

If it is determined in ST149 that no interruption function is present, operations of checking the memory full state, disconnecting the line, and the like are performed in ST152, ST153, and ST154, as in ST144 to ST146.

As has been described above in detail, according to the present invention, when a memory full state is detected during facsimile reception, a reception image printing request is issued. It is detected whether paper jam has occurred or the copying operation is being performed. During the copying operation, the facsimile reception image is preferentially printed by an interrupt. With this arrangement, the reception image memory rarely becomes full during facsimile reception, and printing can be continued without disconnecting the like. Hence, a convenient image forming apparatus can be provided.

What is claimed is:

1. An image forming apparatus characterized by comprising:

a reception image memory for storing reception image data;

means for checking whether a printing operation using the reception image data stored in said reception image memory can be started when a remaining capacity of said reception image memory has not more than a predetermined value;

means for starting printing using the reception image data when it is determined by said checking means that printing is possible;

means for, when a printing disable state is detected by said checking means, displaying the printing disable state and checking whether a cause is paper jam; and means for, when the cause is paper jam, causing said reception image memory to continuously receive and store the reception image data.

2. An image forming apparatus characterized by comprising:

a reception image memory for storing reception image data;

means for checking whether a printing operation using the reception image data stored in said reception image memory can be started when a remaining capacity of said reception image memory has not more than a predetermined value;

means for starting printing using the reception image data when it is determined by said checking means that printing is possible;

means for, when a printing disable state is detected by said checking means, displaying the printing disable state and checking whether a cause is paper jam or an operation of copying means;

means for, when the cause is paper jam, causing said reception image memory to continuously receive and store the reception image data;

determination means for, when the cause is the operation of said copying means, determining whether the operation can be stopped;

interruption designation means for, when said determination means determines that the operation can be stopped, designating interruption; and means for printing the reception image data in response to designated interruption.

3. An image forming apparatus according to claim 2, characterized by further comprising a tray for receiving a copy paper sheet formed during copying, and means for outputting a reception image printing paper sheet formed in response to the designated interruption to a position discriminated from that of the copy paper sheet.

4. An image forming apparatus according to claim 2, characterized in that said copying means comprises a copy image memory for storing copy image data, means for sequentially reading out the stored copy image data in units of page data, a page memory for storing the page data thus read out, printing means for printing the page data stored in said page memory, and means for overwriting an area where the page data is partially read out from said image memory to said page memory as a free area of said copy image memory, and that said interrupting means includes means for interrupting the operation when printing of the page data stored in said page memory is completed.

5. An image forming apparatus according to claim 4, characterized in that said reception image data printing means comprises control means having means for switching an image memory area where the image data is read out from said reception image memory from an overwrite disable state to an overwrite enable state when the remaining capacity of said reception image memory has not more than a predetermined value, confirmation means for conforming that printing of the page data stored in said page memory is completed, and means for, in response to a confirmation output from said confirmation means, transferring the next page data from said reception image memory to said page memory.

6. An image forming apparatus according to claim 4, characterized in that said control means comprises detection means for detecting paper jam in said printing means, means for holding the page data stored in said page memory in accordance with an output from said detection means, means for detecting elimination of the paper jam, means for continuing to print the page data stored in said page memory in response to the elimination, confirmation means for confirming completion of printing of the page data, and means for transferring the next page data from said image memory to said page memory upon receiving a confirmation output from said confirmation means.

7. An image forming apparatus characterized by comprising:

a reception image memory for storing reception image data;

means for checking whether a printing operation using the reception image data stored in said reception image memory can be started when a remaining capacity of said reception image memory has not more than a predetermined value;

means for starting printing using the reception image data when it is determined by said checking means that printing is possible;

means for, when a printing disable state is detected by said checking means, displaying the printing disable state and checking whether a cause is paper jam or an operation of copying means;

means for, when the cause is paper jam, causing said reception image memory to continuously receive and store the reception image data;

interruption designation means for, when the cause is the operation of said copying means, designating interruption;

means for printing the reception image data in response to the interruption designated; and means for causing said copying means to continue interrupted printing when printing of the reception image data is completed.

8. An image forming apparatus in an image data transmission/reception system including first and second apparatuses having reading means, connected to each other through a communication line, for reading originals and converting originals signal into image data, transmission means for transmitting image data read from the originals, reception means for receiving the image data, and image forming means for forming images of the image data on target image forming medium, characterized in that each of said first and second apparatuses comprises:

a reception image memory for storing reception image data;

means for checking whether a printing operation using the reception image data stored in said reception image memory can be started when a remaining capacity of said reception image memory has not more than a predetermined value;

means for starting printing using the reception image data when it is determined by said checking means that printing is possible;

means for, when a printing disable state is detected by said checking means, displaying the printing disable state and checking whether a cause is paper jam or an operation of copying means; and means for, when the cause is paper jam, causing said reception image memory to continuously receive and store the reception image data.

9. An image forming apparatus according to claim 8, characterized in that said reception image data printing means comprises control means having means for switching an image memory area where the image data is read out from said reception image memory from an overwrite disable state to an overwrite enable state when the remaining capacity of said reception image memory has not more than a predetermined value, confirmation means for conforming that printing of the page data stored in said page memory is completed, and means for, in response to a confirmation output from said confirmation means, transferring next page data from said reception image memory to said page memory.

10. An image forming apparatus according to claim 9, characterized in that said control means comprises detection means for detecting paper jam in said printing means, means for holding page data stored in said page memory in accordance with an output from said detection means, means for detecting elimination of the paper jam, means for continuing to print the page data stored in said page memory in response to the elimination, confirmation means for confirming completion of printing of the page data, and means for transferring the next page data from said image memory to said page memory upon receiving a confirmation output from said confirmation means.

11. An image forming apparatus in an image data transmission/reception system including first and second apparatuses having reading means, connected to each other through a communication line, for reading originals and converting a read originals signal into image data, transmission means for transmitting the image data read from the originals, reception means for receiving the image data transmitted, and image forming means for forming images of the image data on target image forming medium, characterized in that each of said first and second apparatuses comprises:
a reception image memory for storing reception image data;
means for checking whether a printing operation using the reception image data stored in said reception image memory can be started when a remaining capacity of said reception image memory has not more than a predetermined value;
means for starting printing using the reception image data when it is determined by said checking means that printing is possible;
means for, when a printing disable state is detected by said checking means, displaying the printing disable state and checking whether a cause is paper jam or an operation of copying means;
means for, when the cause is paper jam, causing said reception image memory to continuously receive and store the reception image data;
interruption designation means for, when the cause is the operation of said copying means, designating interruption; and
means for printing the reception image data in response to the interruption designated.

12. An image forming apparatus according to claim 11, characterized in that said reception image data printing means comprises control means having means for switching an image memory area where the image data is read out from said reception image memory from an overwrite disable state to an overwrite enable state when the remaining capacity of said reception image memory has not more than a predetermined value, confirmation means for conforming that printing of the page data stored in said page memory is completed, and means for, in response to a confirmation output from said confirmation means, transferring next page data from said reception image memory to said page memory.

13. An image forming apparatus according to claim 12, characterized in that said control means comprises confirmation means for confirming completion of printing of page data stored in said page memory, and means for transferring the next page data from said image memory to said page memory upon receiving a confirmation output from said confirmation means.

14. An image forming apparatus according to claim 12, characterized in that said control means comprises detection means for detecting paper jam in said printing means, means for holding the page data stored in said page memory in accordance with an output from said detection means, means for detecting elimination of the paper jam, means for continuing to print the page data stored in said page memory in response to the elimination, confirmation means for confirming completion of printing of the page data, and means for transferring the next page data from said image memory to said page memory upon receiving a confirmation output from said confirmation means.

* * * * *